United States Patent
Terry et al.

(10) Patent No.: US 8,498,668 B2
(45) Date of Patent: Jul. 30, 2013

(54) CENTRALIZED RADIO NETWORK CONTROLLER

(75) Inventors: Stephen E. Terry, Northport, NY (US); James M. Miller, Verona, NJ (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 13/156,004

(22) Filed: Jun. 8, 2011

(65) Prior Publication Data

US 2011/0235617 A1    Sep. 29, 2011

Related U.S. Application Data

(63) Continuation of application No. 10/853,383, filed on May 25, 2004, now Pat. No. 7,983,716.

(60) Provisional application No. 60/507,805, filed on Sep. 30, 2003.

(51) Int. Cl.
    *H04B 1/38*          (2006.01)

(52) U.S. Cl.
    USPC ........... 455/560; 455/424; 455/445; 455/500; 370/360; 370/395.52; 370/396; 370/400

(58) Field of Classification Search
    USPC ........................................................ 455/560
    See application file for complete search history.

(56) References Cited

U.S. PATENT DOCUMENTS

| | | | |
|---|---|---|---|
| 6,611,547 B1 * | 8/2003 | Rauhala | 370/331 |
| 6,819,652 B1 | 11/2004 | Akhtar et al. | |
| 6,845,095 B2 | 1/2005 | Krishnarajah et al. | |
| 6,912,390 B2 | 6/2005 | Andersson et al. | |
| 6,954,441 B2 | 10/2005 | Musikka | |
| 2002/0049048 A1 | 4/2002 | Haberland | |
| 2002/0191556 A1 | 12/2002 | Krishnarajah et al. | |
| 2003/0012154 A1 | 1/2003 | Musikka | |
| 2003/0039246 A1 * | 2/2003 | Guo et al. | 370/389 |
| 2003/0214925 A1 * | 11/2003 | Diaz Cervera et al. | 370/335 |
| 2003/0224826 A1 * | 12/2003 | Sakata et al. | 455/560 |
| 2004/0009773 A1 * | 1/2004 | Kato | 455/445 |
| 2004/0066777 A1 * | 4/2004 | Vesterinen et al. | 370/352 |

* cited by examiner

*Primary Examiner* — Charles Appiah
*Assistant Examiner* — Mazda Sabouri
(74) *Attorney, Agent, or Firm* — Volpe and Koenig, P.C.

(57) ABSTRACT

In a radio access network, novel systems and methods reduce processing delay, and improve integration with IP networks, by separating user data from connection management and control data at a Node B or at a base station. The user data are routed to an IP (Internet Protocol) switch, whereas the connection management and control data are routed to a centralized radio network controller (RNC). Pursuant to a second embodiment of the invention, a centralized RNC provides improved radio resource management (RRM) functionality by handing all connection management and control data for a plurality of Node B's, thereby simplifying the switching of user data throughout the radio access network. Pursuant to a third embodiment of the invention, a smart IP switch is equipped to switch user data without core network (CN) involvement. Downlink user data are switched independently of uplink user data.

18 Claims, 4 Drawing Sheets

CENTRALIZED RADIO NETWORK CONTROLLER

CROSS REFERENCE TO RELATED APPLICATION

This application is a continuation of U.S. patent application Ser. No. 10/853,383, filed on May 25, 2004, which claims priority from U.S. patent application Ser. No. 60/507,805, filed Sep. 30, 2003 which is incorporated by reference as if fully set forth.

FIELD OF THE INVENTION

The present invention relates generally to wireless communication systems. More specifically, the present invention is directed to an improved radio network controller (RNC) and Universal Terrestrial Radio Access Network (UTRAN) architecture for more efficiently processing of user data and control signaling.

BACKGROUND

Figure 1:
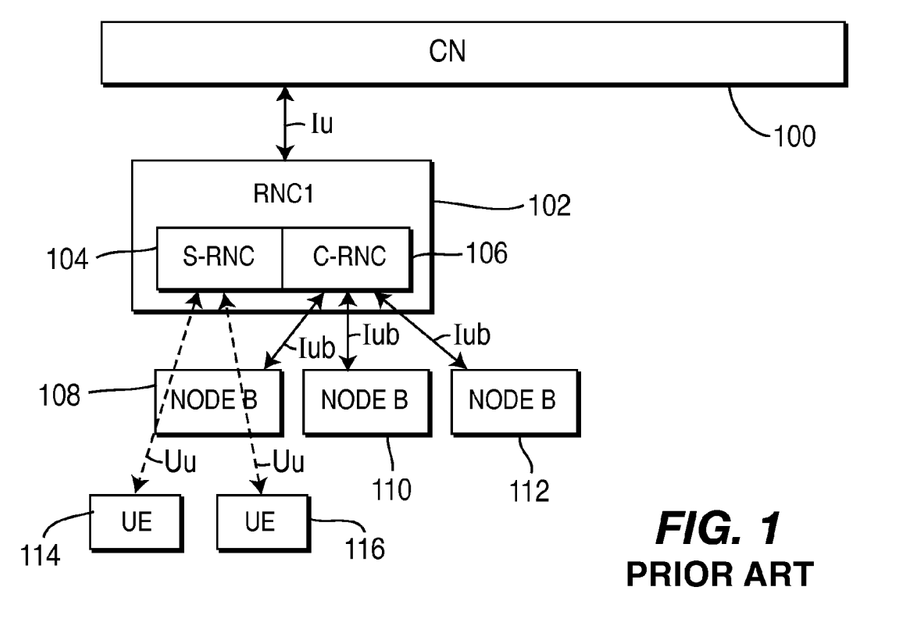
FIG. 1 is a block diagram of a prior art UTRAN system.

Current wireless communication networks typically utilize a distributed radio access architecture. For example, the Third Generation Partnership Project (3GPP) universal terrestrial radio access network (UTRAN), utilizes a distributed RNC architectural configuration as shown in FIG. 1. A serving RNC (S-RNC) 104 manages one or more user equipment (UEs) 114, 116. User and control data from an S-RNC 104 is passed directly through a Node B 108 via Uu interfaces to the UEs 114, 116 that it manages. The S-RNC is also coupled with the Core Network (CN) 100 via an Iu interface, which provides a control and user data interface to the regular terrestrial circuit or packet networks. A controlling RNC (C-RNC) 106 manages one or more Node Bs 108, 110, 112 via Iub interfaces. The Node Bs 108, 110, 112, in turn, each control one or more base stations (not shown).

In practice, any RNC takes on the role of both an S-RNC 104 and a C-RNC 106. For example, the RNC may provide S-RNC services to UEs that initiate calls with base stations coupled to Node Bs controlled by the RNC but might have roamed to other base stations controlled by other RNCs; and may also provide C-RNC services to the base stations it controls. As a general consideration, S-RNCs control UEs, whereas C-RNCs control Node Bs. S-RNCs control and receive UE measurements. C-RNCs control and receive Node B measurements.

A distributed RNC architecture is utilized so that user plane (U-Plane) data and control plane (C-Plane) data is combined within the RNC 102, for forwarding through the Node Bs, such as Node B 108, to the UEs, such as UEs 114, 116. The U-Plane is responsible for conveying user data to and from UEs. The C-Plane is responsible for setting up and removing UE connections and for implementing network signaling functions. This permits most of the complex processing to be performed within the RNC 102, thus simplifying the construction and lowering the costs of the Node Bs 108-112.

Figure 2:
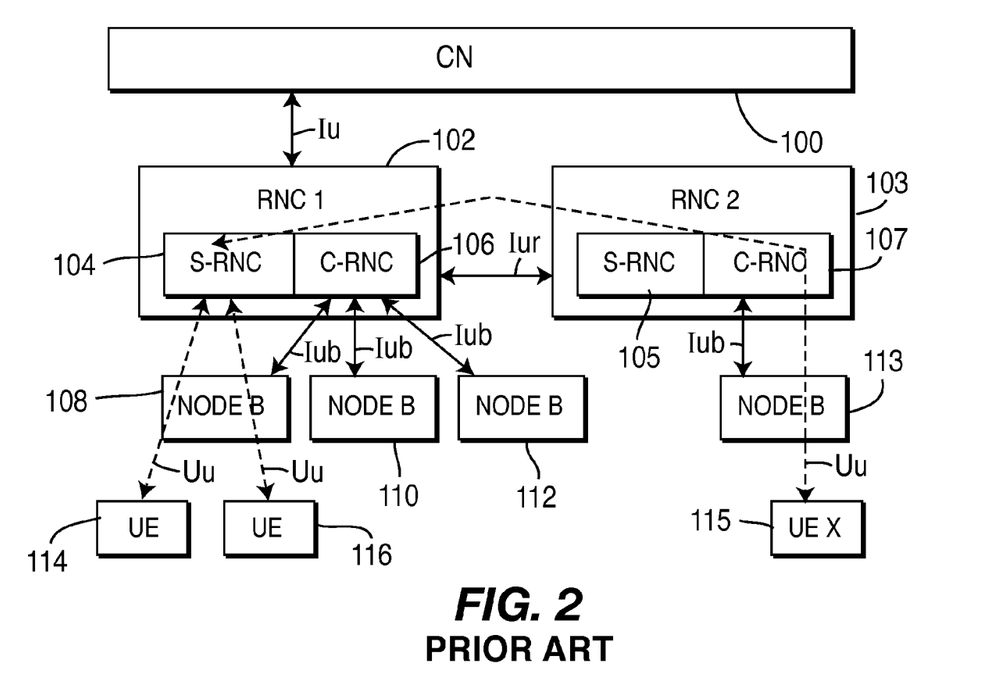
FIG. 2 is a block diagram of distributed RNC functionality in a prior art UTRAN system.

With reference to FIG. 2, a UE (such as UE X 115) may move between Node Bs 108-112 in a series of inter-Node B cell changes. Although some of the inter-Node B cell changes do not involve a C-RNC change, eventually, such an inter-Node B cell change may involve a change to a new Node B under control of another C-RNC; such as the change between Node B 112 (which is controlled by C-RNC 106) and Node B 113 (which is controlled by C-RNC 107).

It is not practical in many circumstances to move the connection between a first RNC such as RNC 1 (102) and the CN 100, to between a second RNC such as RNC 2 (103) and the CN 100 to follow a UE as it moves between Node Bs 108-113. Provisions are made to keep the connection between RNC 1 (102) and the CN 100 while permitting control of the UE by RNC 2 (103). In this case, RNC 2 (103) is referred to as a "drift RNC" (D-RNC). Communications between RNCs are conducted over a connection referred to as an Iur interface.

There is a partial control change between RNCs in that UE X 115 communicates with RNC 2 (103), which transparently passes user and control data from RNC 1 (102) to UE X 115. User and control data for UE X 115 is still controlled by RNC 1 (102) and all user and control data that goes to UE X 115, comes from RNC 1 (102). Although RNC 2 (103) does not control UE X 115 and does not know what user or control data has been sent to or from UE X 115, RNC 2 (107) controls cell measurements (via an Iub interface) pertaining to the Node B 113 in communication with UE X 115. As a result, more than one RNC controls UE X 115.

Since the CN 100 is limited in terms of how fast it can reroute the U-Plane and the C-Plane from one RNC to another, it is not always possible to synchronize the relocation of the U-Plane and the C-Plane functions from the CN 100 to the new C-RNC 107. As a result, measurements necessary to implement radio resource management (RRM) functions for UE X 115 are distributed between RNCs (i.e., RNC 1 102 and RNC 2 103). For example, the user admission control function that allows UE X 115 to establish a connection exists in RNC 1 (102), but the call admission control function that allocates dedicated resources exists in RNC 2 (103).

Distributed RNC systems are designed to handle expected or anticipated U-Plane traffic over a wireless system in a given geographic area. In large metropolitan areas, the amount of U-Plane traffic over a wireless system is often orders of magnitude greater than the amount of C-Plane traffic. Thus, U-Plane connectivity requirements generally dictate the location and number of RNCs 102, 103 that are needed to support the wireless system. RNCs are expensive hardware elements since they must support both U-Plane and C-Plane functions. The cost of providing a distributed RNC architecture escalates in regions where RNCs are called upon to handle relatively large amounts of U-Plane traffic. Additionally, in rural areas where U-Plane data communication requirements are distributed over large areas, it may not be economically feasible to provision terrestrial resources in the form of a centralized point of presence.

Another drawback with an architecture having RNCs which are distributed is that the efficiency of RRM functions is reduced. RRM functions are performed most efficiently within a single RNC that has all of the data for an RRM function available to it. For example, as aforementioned, S-RNCs control and receive UE measurements, whereas C-RNCs control and receive Node B measurements. RRM functions often require both UE and Node B measurements. In order to operate most efficiently, the RNC performing the particular RRM function should have all of the information, both uplink (UL) and downlink (DL) for all cells in UE. With the distributed architecture, one RNC will have the information for the cell-based measurements (the UL measurements) whereas another RNC will have the UE-based measurements (the DL measurements). Accordingly, a single RNC does not have all of the information required to efficiently make decisions.

Although is possible to forward or request measurements between S-RNCs and D/C-RNCs, the amount of measurement information that can be forwarded or requested is limited, and the transfer of information incurs delays. Moreover, although it is useful for RRM functions to consider measurements and channel allocations from neighboring cells, this is not always possible, in particular when a neighboring cell is controlled by another RNC.

When RNCs are distributed and each RNC manages fewer cells, less neighbor cell information is available for the performance of RRM functions. Furthermore, as the distribution of RNCs is increased across a given service area, the efficiency of RRM functions is reduced.

What is needed is an improved architectural scheme that overcomes the disadvantages of a distributed RNC configuration.

SUMMARY OF THE INVENTION

In a wireless communication network, the system and method of the present invention separate U-Plane data from C-Plane data at a Node B or at a base station to more efficiently process transmission data, improve Radio Resource Management (RRM), and provide improved integration with Internet Protocol (IP) networks. The user data is routed via the U-Plane to a smart IP switch, whereas the connection management and control data are separately routed via the C-Plane to a centralized RNC. The smart IP switch accepts control input from the centralized RNC specifying the manner in which to route data, and is also equipped to switch DL and UL data independently.

The centralized RNC only handles C-Plane data whereas the smart IP switch only handles U-Plane data. Therefore, the more resource-intensive task of switching potentially large amounts of U-Plane data has been shifted to a less complex and costly component; namely, the smart IP switch.

BRIEF DESCRIPTION OF THE DRAWINGS

A more detailed understanding of the invention may be had from the following description of a preferred embodiment, to be understood in conjunction with the accompanying drawings wherein.

DETAILED DESCRIPTION OF THE PREFERRED EMBODIMENTS

Hereinafter, the terminology "wireless transmit/receive unit" (WTRU) includes but is not limited to a user equipment, mobile station, fixed or mobile subscriber unit, pager or any other type of device capable of operating in a wireless environment. In CDMA systems specified by the Third Generation Partnership Project (3GPP), base stations are called Node Bs and subscriber units are called User Equipment (UEs). When referred to hereinafter, the terminology "base station" includes but is not limited to a Node-B, site controller, access point or other interfacing device in a wireless environment.

In accordance with the present invention, transmission data is more efficiently processed, RRM performance is improved, and integration with IP networks is improved by separating user data from connection management and control data, (hereinafter, "control data"). The user data is routed to a smart IP switch, whereas the connection management and control data is routed to a centralized RNC.

Figure 3:
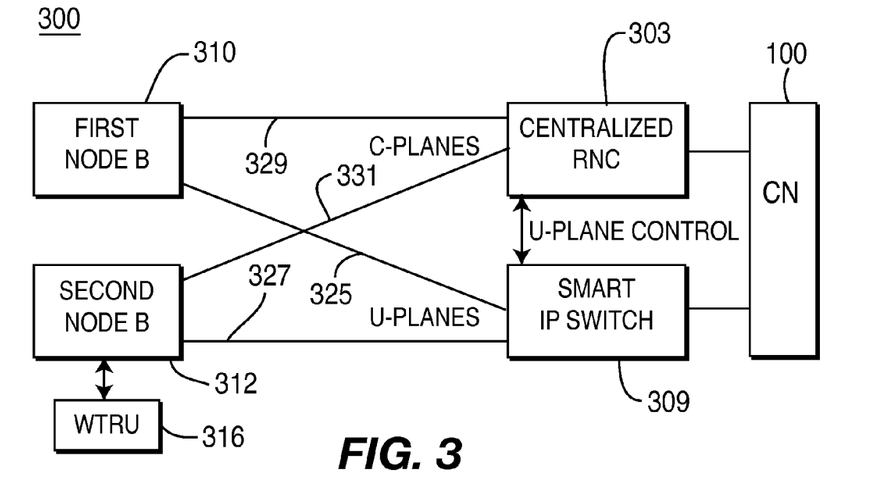
FIG. 3 is a generalized block diagram of centralized RNC functionality in accordance with the present invention.

Referring to FIG. 3, a first preferred embodiment of a system 300 in accordance with the present invention is shown. The system 300 includes a CN 100, a centralized RNC 303, a smart IP switch 309, and first and second Node Bs 310, 312. A WTRU 316 is shown as being wirelessly coupled to the second Node B 312. Although only one WTRU 316 is shown for simplicity, it should be understood that a plurality of WTRUs are able to be supported by the present invention. Additionally, although only two Node Bs 310, 312 are shown, it would be appreciated by those of skill of the art that the present invention applies to a single Node B as well as many Node Bs.

A C-Plane runs from the centralized RNC 303 to each Node B 310, 312. For example, a first C-Plane 329 runs between the centralized RNC 303 and the first Node B 310, and a second C-Plane 331 runs from the centralized RNC 303 to the second Node B 312. A U-Plane couples each Node B 310, 312 to the smart IP switch 309. For example, a first U-Plane 325 couples the IP switch 309 to the first Node B 310, and a second U-Plane 327 couples the smart IP switch 309 to the second Node B 312.

In contrast to the prior art system shown in FIGS. 1 and 2 wherein the user and control data were sent together from the UEs to the RNC for processing, as shown in FIG. 3, control data is separated from user data at the one or more Node Bs 310, 312. User data is carried on the U-Planes 325, 327, and control data is carried on the C-Planes 329, 331. It should be noted that this separation function could also be provided at the base stations (not shown) without departing from the spirit and scope of the present invention.

Figure 4:
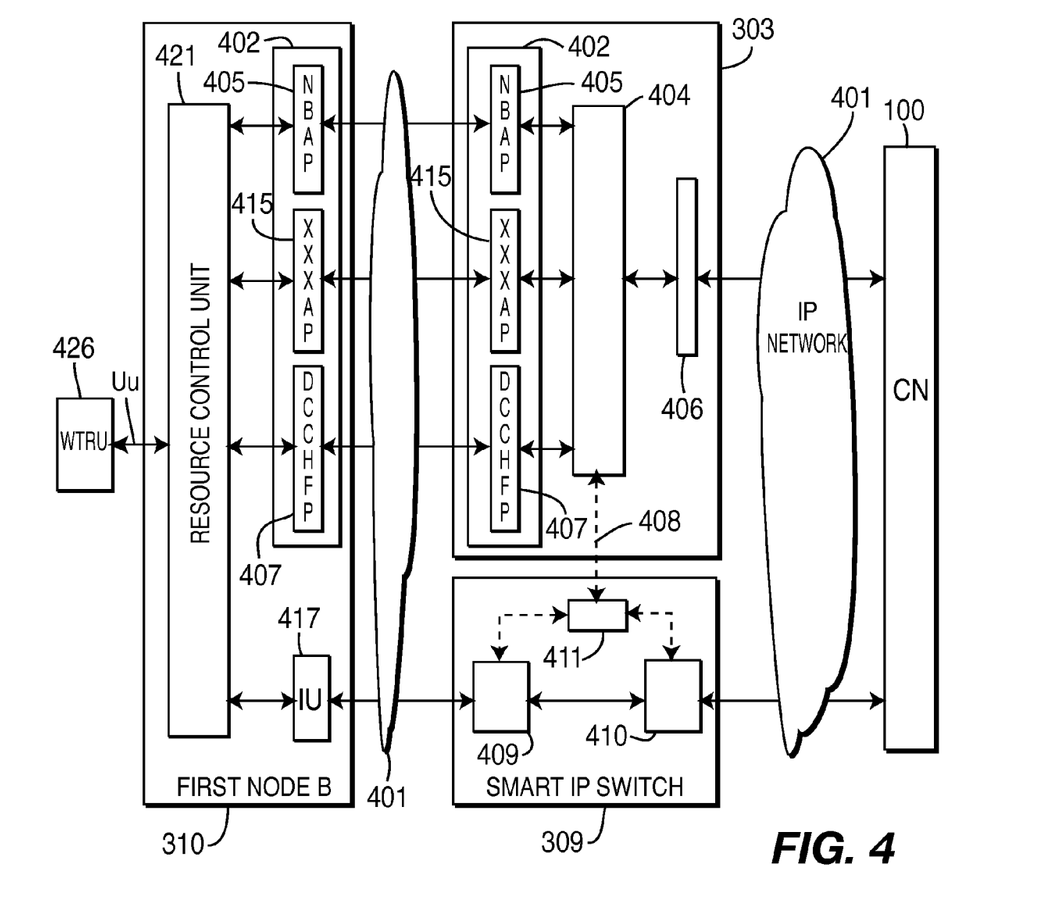
FIG. 4 is a block diagram of a centralized RNC and a smart IP switch in accordance with the present invention.

FIG. 4 is a block diagram showing the centralized RNC 303, the smart IP switch 309 and the first Node B 310 in greater detail. Since control data is separated from user data at the first Node B 310, several RNC functions and protocol termination points which traditionally have been handled by the RNC in prior art architectural designs are now performed in a more efficient manner by the smart IP switch 309 or the first Node B 310.

The first Node B 310 is the logical node responsible for radio transmission and reception in one or more cells with the WTRUs, such as WTRU 426. The first Node B 310 provides a Uu interface to the WTRU 426, a control data interface 402 to the centralized RNC 303, and a user data interface 417 to the smart IP switch 309. The first Node B 310 also includes a resource control unit 421.

The Uu interface with the WTRU 426 is a radio interface. This radio interface is divided into three layers, layer 1 (L1) which is referred to as the "physical layer"; layer 2 (L2) which is referred to the "link layer"; and layer 3 (L3) which is referred to as the "control layer".

Layer 1 includes both physical channels and transport channels. It provides for the encoding and decoding of the transport channels, and the mapping of transport channels onto physical channels. Layer 1 also includes RF processing, such as modulation, demodulation, spreading and despreading.

Layer 2 is divided into two sublayers: the media access control (MAC) sublayer, and the radio link control (RLC) sublayer. The MAC sublayer is responsible for multiplexing data from multiple sources onto a physical channel. The RLC sublayer segments the data streams into frames that are small enough to be transmitted over the Uu radio interface.

The Layer 3 interface radio resource control (RRC), which controls the use of radio resources, and attributes of physical and transport channels over the Uu interface, (i.e. the air interface).

Employing both a control data interface 402 to support the C-Plane, (329 shown in FIG. 3), and a user data interface 417 to support the U-Plane, (325 shown in FIG. 3), permits user data to be separated from control data at the first Node B 310. The control data interface 402 permits the first Node B 310 to communicate with the centralized RNC 303 over an IP network 401. The control data interface 402 may comprise one or more types of interfaces, shown as a Dedicated Control Channel Frame Protocol (DCCH FP) interface 407, a Node B Application Part (NBAP) interface 405 and any other type of control interface (graphically illustrated as an XXXAP interface 415). Although these particular types of interfaces have been shown by way of example, it should be understood by those of skill in the art that any type of control data interface, either now known or future envisioned, may be employed in a similar manner without departing from the spirit and scope of the present invention.

The DCCH FP interface 407 provides the frame protocol interface for the DCCH signaling. In the prior art, this function was included within the Dedicated Channel frame protocol within the RNC.

The NBAP interface 405 provides control signaling between the RNC 303 and Node B 310.

The XXXAP interface 415 provides the primitives between the RRC and the Layer 2 MAC/RLC functions. In the prior art, this was previously internally transmitted within the prior art RNC.

The user data 417 interface, such as Iu interface, is similar to the Iu U-Plane connection in the prior art. The user data interface 417 is first termination point for the U-Plane (such as U-Planes 327, 331 shown in FIG. 3). The second termination point is within the smart IP switch 309, which will be described in detail hereinafter. Therefore, the CN 100 can interoperate between a prior art RNC and the centralized RNC 303 made in accordance with the present invention.

The resource control unit 421, performs Layer 2 MAC and RLC processing by implementing RLC protocols and various MAC functions, such as MAC-common channel (MAC-c), MAC-dedicated channel (MAC-d), MAC-shared channel (MAC-sh), and MAC-paging channel (MAC-p). It should be noted that, prior art approaches performed Layer 2 processing in the RNC.

The centralized RNC 303 includes a control unit 404, a control data interface 402, a radio access network application part (RANAP) 406 interface and an interface to the smart IP switch 309. The control unit 404 supports control signaling for configuring each resource that is needed for the call including the centralized RNC 303, the Node B 310 and the WTRU 426. The resource control unit 404 interface with the first Node B 310 through the control data interfaces 402. The control data interface 402 supports the C-Plane and includes an NBAP interface 405, an XXXAP interface 415, and DCCH FP interface 407, which are the counterpart interfaces to those explained with reference to the first Node B 310, and which operate in the same manner. A common control channel (CCCH) interface (not shown) may also be used in the same manner as the DCCH interface 407.

The resource control unit 404 performs control signaling for the Radio Access Network (RAN), and therefore is responsible for controlling and coordinating use of the radio resources. The resource control unit 404 manages the WTRUs 426 via RRC signaling, and manages Node Bs 310, 312 using NBAP signaling, both of which are sent over the C-Plane interfaces 329, 331. This functionality allows the centralized RNC 303 to function as a common entity for managing both WTRUs 316 and Node Bs 310. These management features, not provided by any known prior art architecture, improve network performance because both UL and DL measurements are available to RRM algorithms with minimal latency. Moreover, measurements from all WTRUs within one or more cells are available to the RRM algorithm at the centralized RNC 303. These factors allow improved RRM decisions that result in a more efficient use of physical resources.

The IP switch 309 includes a router resource control 411, and first and second termination points 409, 410. The first termination point 409 terminates the U-Planes (such as U-Planes 325, 327 shown FIG. 3) in the IP switch 309. The termination point 409 serves as a location where the Iub protocol headers are added and the other protocol functions like retransmission/error recovery take place. As aforementioned, the first Node B 310 is the first termination point for the Iub protocol, (at the user data interface 417) as in the prior art. However, unlike the prior art, the other termination point was the RNC, not the IP switch 309 as with the present invention. Since Layer 2 processing requirements are removed from the IP switch 309, the IP switch 309 provides layer 3 switching of user data more efficiently than can be accomplished pursuant to prior art distributed RNC architectures. Termination point 410 allows for combining or splitting of data when multiple Node B termination points are created during user plane relocation.

The termination points 409, 410 are controlled by the router resource control 411. The router resource control 411 binds together the termination points 409 and 410 for each user and forwards the data in each direction between the points. This can include multiple 409 termination points for the relocation of the user plane.

The smart IP switch 309 is "smart" in the sense that it is: 1) equipped to accept a control input 408 from the centralized RNC 303 specifying the manner in which to route data; and 2) is also equipped to switch DL and UL data independently. In contrast to a traditional IP router/switch which uses a preset operator configuration to statically route IP packets through the network, the IP switch 309 routes the data streams based on configuration from the centralized RNC 303 and is modified on a call-by-call basis. Although prior art IP switches normally have the ability to route UL and DL data, the smart IP switch 309 in accordance with the present invention will perform the actions necessary for UTRAN operation, such as duplicating data paths in one direction while combining data paths in the other. Thus, the call-by-call configuration from the centralized RNC 303 permits the IP switch 309 to manipulate the data streams for each user. This configuration may also be modified for a particular user multiple times within a single call. This will be explained further with reference to FIGS. 5A-5D In order to minimize the requirement for synchronized WTRU 316 inter-Node B handovers, (such as from the second Node B 312 to the first Node B 310), and U-Plane relocations within the CN 100, U-Plane establishment, release, and routing is performed within the IP switch 309. The U-Plane is terminated in the Node B 310 at data interface 417. However, for an inter-Node B handover, the data interface point 417 moves from one Node B to another, since the call is handed off from one Node B to another. Using the mechanisms in accordance with the present invention, the termination point is moved from the data interface 417 of one Node B to another, without the other end of the Iu U-Plane connection (within the CN 100) being aware of the change.

One benefit of the present invention is that since the IP switch 309 provides IP routing of U-Plane traffic, it is more efficient in data transport processing, and has a greatly reduced cost, relative to a network entity that performs layer 2 processing and CN 100 U-Plane protocols. In addition to IP routing capability, the IP switch 309 performs IP address translation and splitting (duplication)/combining multiple IP data streams, which allows U-Plane relocations from one Node B to another (i.e., from Second Node B 312 to first Node B 310 to be hidden from CN 100.

As shown, since MAC and RLC processing requirements are removed from the centralized RNC 303, constraints on designing large RNCs are removed. Layer 2 processing, including MAC and RLC functions, is now provided by one or more Node Bs. This results in further enhancements to RRM functionality, which is attributable to increasing the availability of neighboring cell information. Operator cost is also greatly reduced by the reduction in the number of RNCs required to support a given network.

Since RLC and MAC functions need not be present in centralized RNC 303, some internal messaging that used to exist within prior art RNCs is now incorporated into the NBAP 405 protocol. For example, it is preferred that traffic volume measurements (TVM) and timing deviation measurements (TDM), which in the architecture of the present invention are recorded in first Node B 310, are reported to centralized RNC 303. This can be accomplished with modification of the NBAP protocol by expanding the reporting mechanism already existing within NBAP for Node B measurement reporting.

As aforementioned, the Iub protocol refers to an interface between a Node B (such as first Node B 310) and an RNC (such as centralized RNC 303). Iur refers to an interface between two RNCs, such as RNC 1 (102, FIG. 2) and RNC 2 (103, FIG. 2). The Iub frame protocol interface between centralized RNC 303 and first Node B 309 requires changes to support the dedicated control channel (DCCH) 407 and common control channel (CCCH) logical channels generated by the control unit 404. These channels are used to control the WTRUs in an identical manner as prior art. The Iub frame protocol supports a logical channel, and does not support the transport channels of the Iub frame protocol of the current architecture. By adapting the frame protocols used on the Iur interface for MAC-d/MAC-c service data units (SDUs); (also non-transport channel of MAC 424), the logical control channel(s) can be supported between centralized RNC 303 and first Node B 310.

The C-Plane of the Iub is also modified for mobility procedures. Paging and cell update, for example, are transferred from MAC 424 in the Node B to the centralized RNC 303. Mobility control messages previously used on the Iur can be applied to the Iub to support the aforementioned functionality between centralized RNC 303 and first Node B 310.

As in the prior art, the C-Plane exists separately for each RNC/Node B connection. Accordingly, moving from one C-Plane to the other is simple; the centralized RNC 303 starts transmitting on the new C-Plane when necessary and stops using and releases the old C-Plane when the U-Plane has moved.

However, one of the problems in terminating the U-Plane in a Node B is that inter-Node B handovers are still required to move the U-Plane between Node Bs, such as for example the first Node B 310 to the second Node B 312. Movement of the U-Plane anchor is called relocation, and requiring the CN 100 to be involved in every inter-Node B cell change is not acceptable.

A sequence within the IP switch 309 for allowing inter-Node B handovers of the U-Plane without CN 100 interaction is shown in FIGS. 5A-5D. The IP switch 309 provides an anchor point to the CN 100. A switching mechanism within the IP switch 309 allows rerouting of the U-Plane from a Source Node B 503 to a Target Node B 505 without CN 100 intervention. The CN 100 anchor point remains connected to the IP switch 309 throughout the entire U-Plane rerouting sequence.

Figure 5A:
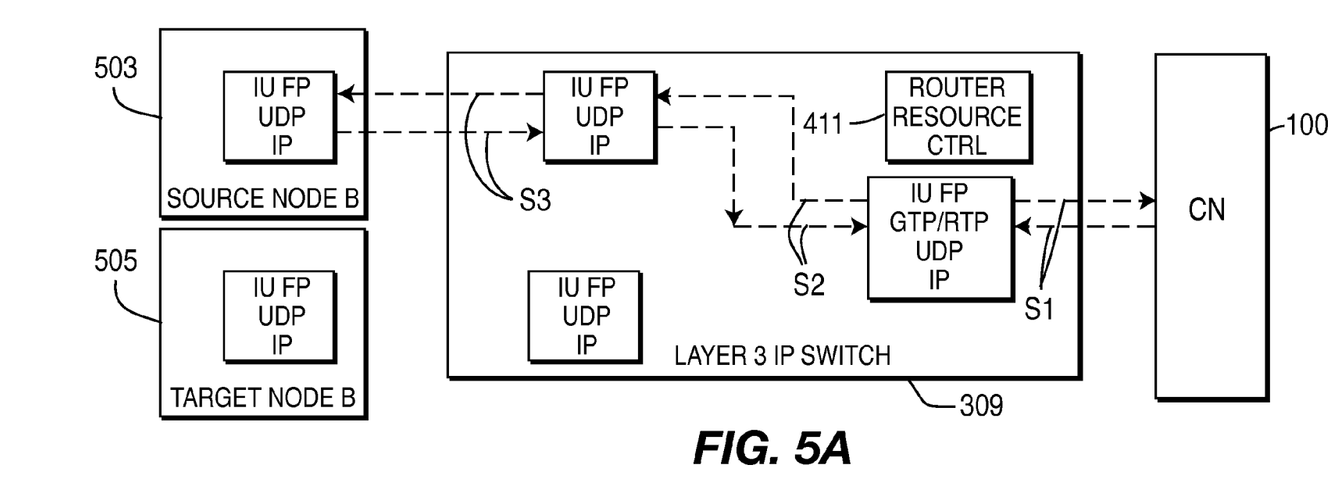
FIGS. 5A-5D are data flow diagrams of a handover process between a source Node B and a target Node B using the smart IP switch in accordance with the present invention.

FIG. 5A shows data flow between CN 100 and Source Node B 503 prior to a handover. In the case of packet data, the IP switch 309 terminates a general packet radio services tunneling protocol (GTP) layer (S1). In the case of circuit switched data, IP switch 309 terminates a real-time transfer protocol (RTP) layer (S1). For both cases (packet switched and circuit switched data), the remaining data are transferred to/from CN 100 and Source Node B 503 (S2 and S3). The remaining data may include at least one of: (a) Iu-interface frame protocol data (IUFP); (b) user datagram protocol (UDP) data; or (c) Internet Protocol (IP) data.

Figure 5B:
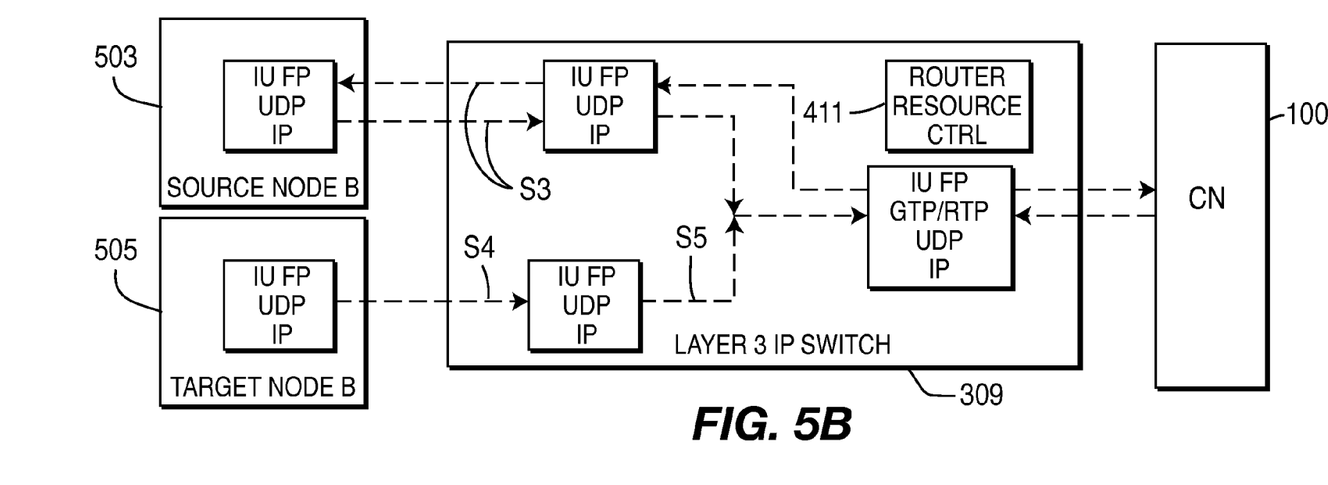

Referring to FIG. 5B, when a handoff from Source Node B 503 to Target Node B 505 is to take place, a new link is activated from Target Node B 505 to the IP switch 309 (S4 and S5). Data that are queued in Source Node B 503 but not yet delivered are transferred to Target Node B 505 using standard tunneling techniques that are used for prior art lossless and seamless handovers. The GTP tunnel is set up so that the user data is forwarded from the source Node B to the target Node B. This is a similar procedure as used in the prior art, with the exception that the tunneling is from Node B to Node B instead of RNC to RNC as it is done in the prior art.

Figure 5C:
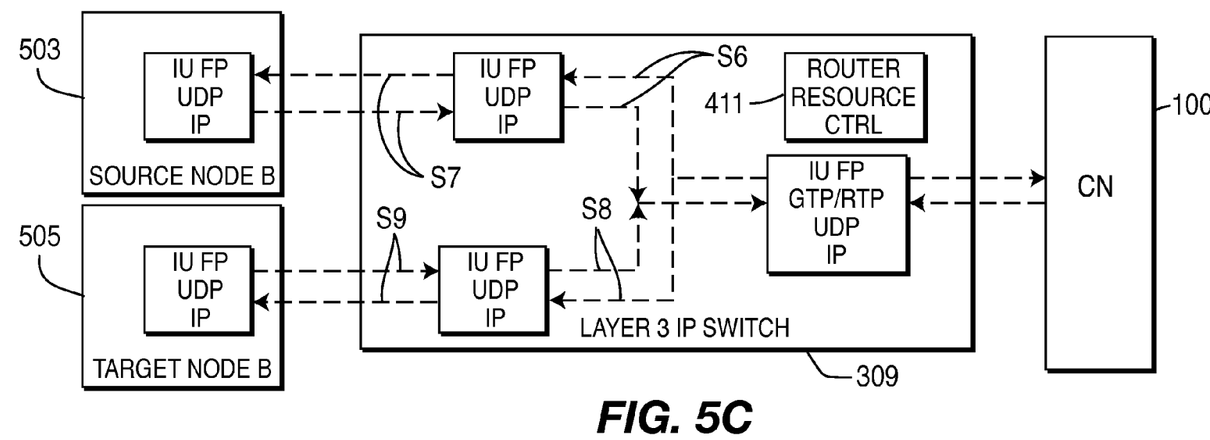

Turning now to FIG. 5C, as the handover from Source Node B 503 to Target Node B 505 progresses, the DL stream is multiplexed to both Source Node B 503 (S6 and S7) and Target Node B 505 (S8 and S9). The UL stream coming from either Source Node B 503 or Target Node B 505 is sent to the same GTP/RTP termination so that the GTP/RTP can be added for the stream going back to CN 100. However, data will be present in only one Node B at a time in a given frame in time division duplex (TDD) systems, since the type of handover employed in such systems is a hard handover. On a frame boundary, data transfer moves from Source Node B 503 to Target Node B 505.

The IP switch 309, in accordance with the present invention duplicates the data paths so that the exact moment of handover does not need to be known to the IP switch 309. Throughout these procedures an interface between the centralized RNC 303 and the IP switch 309 is necessary. This allows for the centralized RNC 303 to control the setup and release of IP routing, and includes the ability to duplicate or combine data flows as shown in FIGS. 5A-5D. To allow for non time-critical signaling between the centralized RNC 303 and the IP switch 309, both links are present during this time even though only one link will be receiving data at one time. The alternative is to have the RNC attempt to coordinate in exact time the handover at the UE and the switchover at the IP switch 309, a difficult process given the variable delays and synchronization throughout the network.

Figure 5D:
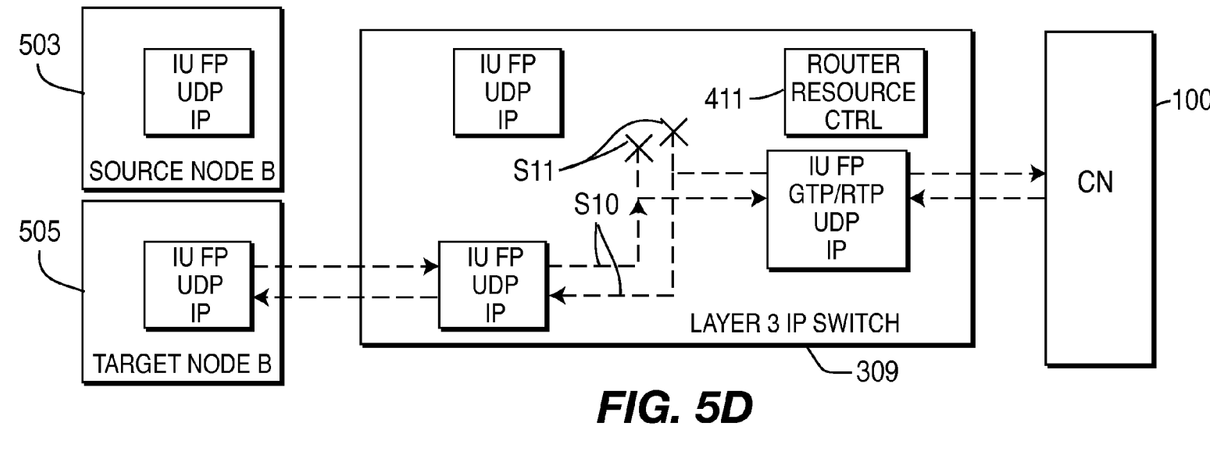

Finally, at FIG. 5D, the handover from Source Node B 503 to Target Node 505 is completed. The IP switch 309 maintains the existing link between CN 100 and Target Node B 505 (S10), but releases the link between CN 100 and Source Node B 503.

Pursuant to a further embodiment of the invention, an AP protocol is added between the centralized RNC 303 (FIG. 4) and first Node B 310 (FIG. 4) to perform relocation involving only the IP switch 309, Source Node B 503, and Target Node B 505. This AP protocol allows for the centralized RNC 303 to signal the Node B so that it is properly setup such that the termination point of the U-Plane and C-Plane of the user can be moved, including any contexts that are necessary to make the move transparent to the core network. In this manner, retaining the same anchor point in the IP switch 309 renders relocation of the U-Plane transparent to CN 100. The switching, duplication and combining of data streams in the IP switch 309 are coordinated by the centralized RNC 303. A new interface as shown in FIG. 4, (the router resource control channel between the control unit 404 and the router resource control 411), is defined for this control signaling. In this signaling the centralized RNC 303 can signal the IP switch to setup additional switching points to allow for the combining and/or splitting of data streams in each direction separately to allow a handover to occur seamlessly without involvement of the CN 100. This signaling is used to set up the channels and provide the splitting and/or combining that is necessary during handover as shown in FIGS. 5A-5D.

Although the preferred embodiments are described in conjunction with a 3GPP wideband code division multiple access (W-CDMA) system utilizing the time division duplex (TDD) mode, the embodiments are applicable to any code division multiple access (CDMA) system or hybrid CDMA/time division multiple access (TDMA) communication system.

What is claimed is:

1. A method for handoff between a source NodeB and a target NodeB, using a layer 3 smart internet protocol (IP) switch that is configured to communicate with a core network (CN) and a radio network controller (RNC) that is separate from the layer 3 smart IP switch, the method comprising:
   the layer 3 smart IP switch receiving user plane data from the source Node B via a user plane;
   the layer 3 smart IP switch receiving a control input from the RNC that includes control information configured to control routing of the user plane data by the layer 3 smart IP switch;
   the layer 3 smart IP switch routing the user plane data to the CN via an IP network based on the control information included in the control input; and
   the layer 3 smart IP switch transferring one or more non-terminated data layers between the CN and the source NodeB, wherein the non-terminated data layers include at least one of an Iu-interface frame protocol data, a user datagram protocol (UDP) data, or IP data,
   wherein on a condition that the routed data comprise packet-switched data, the layer 3 smart IP switch functions as a termination point for a general packet radio services tunneling protocol (GTP) layer between the layer 3 smart IP switch and the CN, thereby terminating the GTP layer.

2. The method of claim 1, further comprising:
   activating a second communication link from the target NodeB to the layer 3 smart IP switch on a condition that a handoff from the source NodeB to the target NodeB occurs.

3. The method of claim 2, further comprising:
   transferring data queued in the source NodeB to the target NodeB, on a condition that the data queued has not yet been delivered to a wireless transmit/receive unit (WTRU).

4. The method of claim 3, wherein the transferring is performed using a tunneling process.

5. The method of claim 1, further comprising:
   multiplexing a downlink data stream from the one or more non-terminated data layers to the source NodeB and the target NodeB.

6. The method of claim 1, further comprising:
   sending an uplink data stream from the source NodeB or the target NodeB to the layer 3 smart IP switch, wherein a general packet radio services tunneling protocol (GTP) layer or a real-time transfer protocol (RTP) layer is incorporated into a return data stream.

7. The method of claim 1, wherein on a condition that the routed data comprise circuit switched data, the layer 3 smart IP switch functions as a termination point for a real-time transfer protocol (RTP) layer between the layer 3 smart IP switch and the CN, thereby terminating the RTP layer.

8. The method of claim 2, further comprising:
   the layer 3 smart IP switch maintaining the second communication link between the CN and the target NodeB, and releasing the first communication link between the CN and the source NodeB.

9. The method of claim 1, further comprising the layer 3 smart IP switch switching downlink (DL) user data and uplink (UL) user data independently.

10. A layer 3 smart IP switch configured to communicate with a core network (CN) and a centralized radio network controller (RNC) that is separate from the layer 3 smart IP switch the layer 3 smart IP switch comprising:
    a receiver configured to receive user plane data from a source Node B via a user plane and a control input from the centralized radio network controller (RNC) that includes control information configured to control routing of the user plane data by the layer 3 smart IP switch; and
    a transmitter configured to route the user plane data to the CN via an IP network based on the control information included in the control input, wherein one or more non-terminated data layers are transferred between the CN and the source NodeB, and wherein the non-terminated data layers include at least one of an Iu-interface frame protocol data, a user datagram protocol (UDP) data, or IP data,
    wherein on a condition that the routed data comprise packet-switched data, the layer 3 smart IP switch functions as a termination point for a general packet radio services tunneling protocol (GTP) layer between the layer 3 smart IP switch and the CN, thereby terminating the GTP layer.

11. The layer 3 smart IP switch of claim 10, further configured to:
    activate a second communication link from a target NodeB on a condition that a handoff from the source NodeB to the target Node B occurs.

12. The layer 3 smart IP switch of claim 11, further configured to:
    transfer data queued in the source NodeB to a target NodeB, on a condition that the data queued has not yet been delivered to a wireless transmit/receive unit (WTRU).

13. The layer 3 smart IP switch of claim 12, wherein the transferring is performed using a tunneling process.

14. The layer 3 smart IP switch of claim 10, further configured to:
    multiplex a downlink data stream from the one or more non-terminated layers to the source NodeB and a target NodeB.

15. The layer 3 smart IP switch of claim 10, further configured to:
    send an uplink data stream from the source NodeB or a target NodeB to the CN, wherein a general packet radio services tunneling protocol (GTP) layer or a real-time transfer protocol (RTP) layer is incorporated into a return data stream.

16. The layer 3 smart IP switch of claim 10, wherein on a condition that the routed data comprise circuit switched data, the layer 3 smart IP switch functions as a termination point for a real-time transfer protocol (RTP) layer between the layer 3 smart IP switch and the CN, thereby terminating the RTP layer.

17. The layer 3 smart IP switch of claim 11, further configured to:
    maintain the second communication link between the CN and a target NodeB, and releasing the first communication link between the CN and the source NodeB.

18. The layer 3 smart IP switch of claim 10, further comprising an apparatus for switching downlink (DL) user data and uplink (UL) user data independently.

* * * * *